US012400397B2

(12) United States Patent
Kim

(10) Patent No.: US 12,400,397 B2
(45) Date of Patent: Aug. 26, 2025

(54) METHOD FOR COORDINATING LOCATION IN THREE-DIMENSIONAL SPACE BY USING SOLID FIGURE

(71) Applicant: Hak Min Kim, Uijeongbu-si (KR)

(72) Inventor: Hak Min Kim, Uijeongbu-si (KR)

(*) Notice: Subject to any disclaimer, the term of this patent is extended or adjusted under 35 U.S.C. 154(b) by 271 days.

(21) Appl. No.: 18/032,209

(22) PCT Filed: Sep. 15, 2021

(86) PCT No.: PCT/KR2021/012536
§ 371 (c)(1),
(2) Date: Apr. 27, 2023

(87) PCT Pub. No.: WO2022/060064
PCT Pub. Date: Mar. 24, 2022

(65) Prior Publication Data
US 2023/0394752 A1     Dec. 7, 2023

(30) Foreign Application Priority Data

Sep. 15, 2020   (KR) .................. 10-2020-0118472

(51) Int. Cl.
  *G06T 17/00*     (2006.01)
  *G06T 7/11*      (2017.01)
(52) U.S. Cl.
  CPC ............... *G06T 17/00* (2013.01); *G06T 7/11* (2017.01)

(58) Field of Classification Search
  CPC ......... G06T 17/00; G06T 7/11; G06T 17/005; G06T 7/70; G06T 7/30
  See application file for complete search history.

(56) References Cited

U.S. PATENT DOCUMENTS

| | | | |
|---|---|---|---|
| 9,754,405 B1* | 9/2017 | Young | ................. G06T 17/005 |
| 2015/0154282 A1* | 6/2015 | Watanabe | ........... G06F 16/2264 |
| | | | 707/743 |
| 2018/0240264 A1* | 8/2018 | Ito | .......................... G06T 17/00 |

FOREIGN PATENT DOCUMENTS

| | | |
|---|---|---|
| JP | 2018-136642 A | 8/2018 |
| JP | 2020-052978 A | 4/2020 |
| KR | 10-2117592 B1 | 6/2020 |
| KR | 10-2125538 B1 | 6/2020 |
| KR | 10-2152879 B1 | 9/2020 |

* cited by examiner

*Primary Examiner* — Jeffery A Brier
(74) *Attorney, Agent, or Firm* — KORUS Patent, LLC; Seong Il Jeong

(57) ABSTRACT

Proposed is a method for representing a location in a three-dimensional space as a coordinate by using a solid figure. The method includes: partitioning a solid base block into a plurality of blocks, the solid base block indicating the three-dimensional space predetermined; allocating a block value to each of the blocks resulting from partitioning; and repeating a block partitioning process and a block value allocation process for each of the blocks resulting from partitioning, wherein on the basis of the block values of the blocks that have been obtained, a particular location in the three-dimensional space is represented as a coordinate and identified.

6 Claims, 6 Drawing Sheets

METHOD FOR COORDINATING LOCATION IN THREE-DIMENSIONAL SPACE BY USING SOLID FIGURE

TECHNICAL FIELD

The present disclosure relates to a technology for identifying a location in a three-dimensional space.

BACKGROUND ART

Korean Patent Application Publication No. 10-2019-0131320 discloses a method for calculating spatial coordinates of a region of interest. This method collects only coordinate information on regions of interest included in images that are respectively obtained by a plurality of image modules, thereby preventing a privacy invasion problem due to hacking.

DISCLOSURE

Technical Problem

The present disclosure is directed to providing a new method for easily representing a particular location in a three-dimensional space as a coordinate and identifying the particular location.

Technical Solution

According to an aspect, there is provided a method for representing a location in a three-dimensional space as a coordinate by using a solid figure, the method including: partitioning a solid base block into a plurality of blocks, the solid base block indicating the three-dimensional space predetermined; allocating a block value to each of the blocks resulting from partitioning; and repeating a block partitioning process and a block value allocation process for each of the blocks resulting from partitioning, wherein on the basis of the block values of the blocks that have been obtained, a particular location in the three-dimensional space is represented as a coordinate and identified.

The method for representing the location in the three-dimensional space as a coordinate may further includes: generating an expansion block by expanding the base block in an expansion block generation step; partitioning the expansion block into a plurality of blocks in an expansion block partitioning step; allocating a block value to each of the blocks resulting from partitioning in the expansion block partitioning step; and repeating the block partitioning process and the block value allocation process for each of the blocks resulting from partitioning in the expansion block partitioning step, wherein on the basis of the block values of the blocks that have been obtained, a particular location outside the three-dimensional space is represented as a coordinate and identified.

Advantageous Effects

According to the present disclosure, a particular location in a three-dimensional space can be easily and accurately represented as a coordinate and identified by using a solid figure. The present disclosure can be applied to and utilized in various fields, for example, to turn smart factories or smart cities into data in a three-dimensional space platform and represent all locations in the space as coordinates for management. In addition, when the present disclosure is applied to autonomous driving technology, accurate location information where an autonomous driving vehicle (for example, a drone) should move in a predetermined three-dimensional space can be provided. In addition, when the present disclosure is used for 3D printing or precision device manufacturing, a very detailed location can be accurately displayed and provided. Furthermore, the present disclosure can be applied to and utilized in various fields that require location identification in a three-dimensional space.

BEST MODE

The aforementioned and additional aspects of the present disclosure will become more apparent through exemplary embodiments described with reference to the accompanying drawings. Hereinafter, the present disclosure will be described in detail with reference to the embodiments, so that those skilled in the art can easily understand and reproduce the embodiments.

Figure 1:
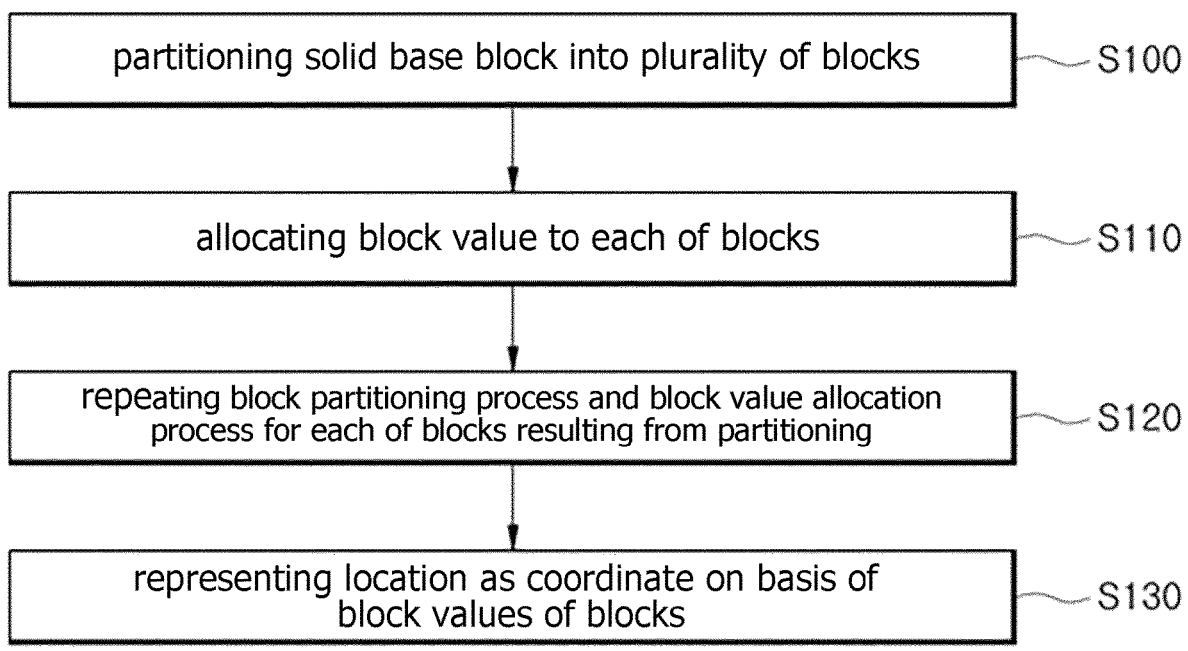
FIG. 1 is a flowchart illustrating a method for representing a location in a three-dimensional space as a coordinate by using a solid figure according to an embodiment.

FIG. 1 is a flowchart illustrating a method for representing a location in a three-dimensional space as a coordinate by using a solid figure according to an embodiment. First, the method according to FIG. 1 may be executed by at least one computing device, specifically, at least one processor belonging to the at least one computing device. In addition, the computing device executing the method for representing a location in a three-dimensional space as a coordinate may be a user terminal, such as a desktop computer, a laptop computer, or a smart pad, which is used by a user in person, or may be configured in a server system linked to a user terminal to provide a user with a service for representing a location in a three-dimensional space as a coordinate.

Figure 2:
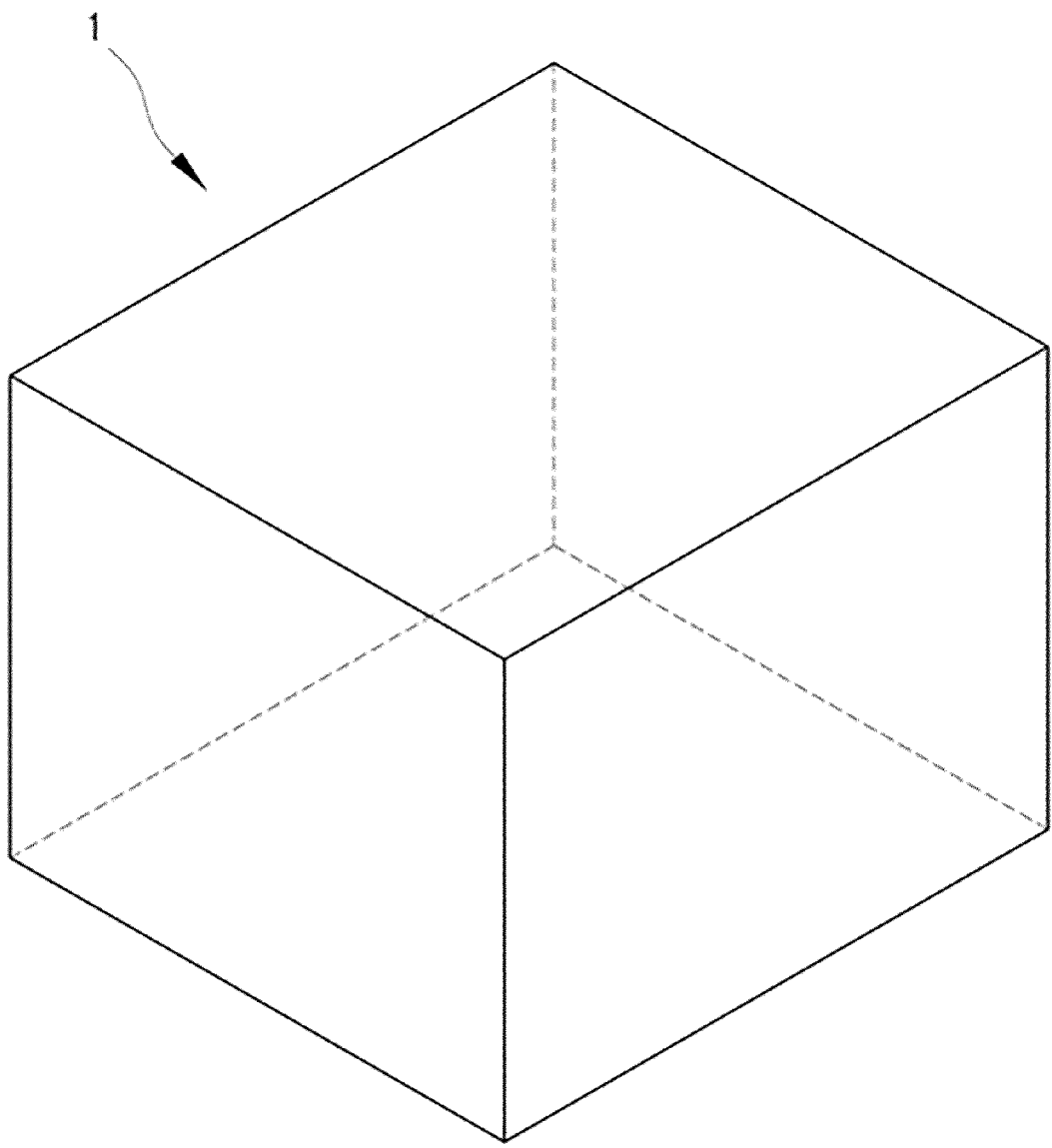
FIG. 2 is a diagram illustrating an example of a solid base block.
Figure 3:
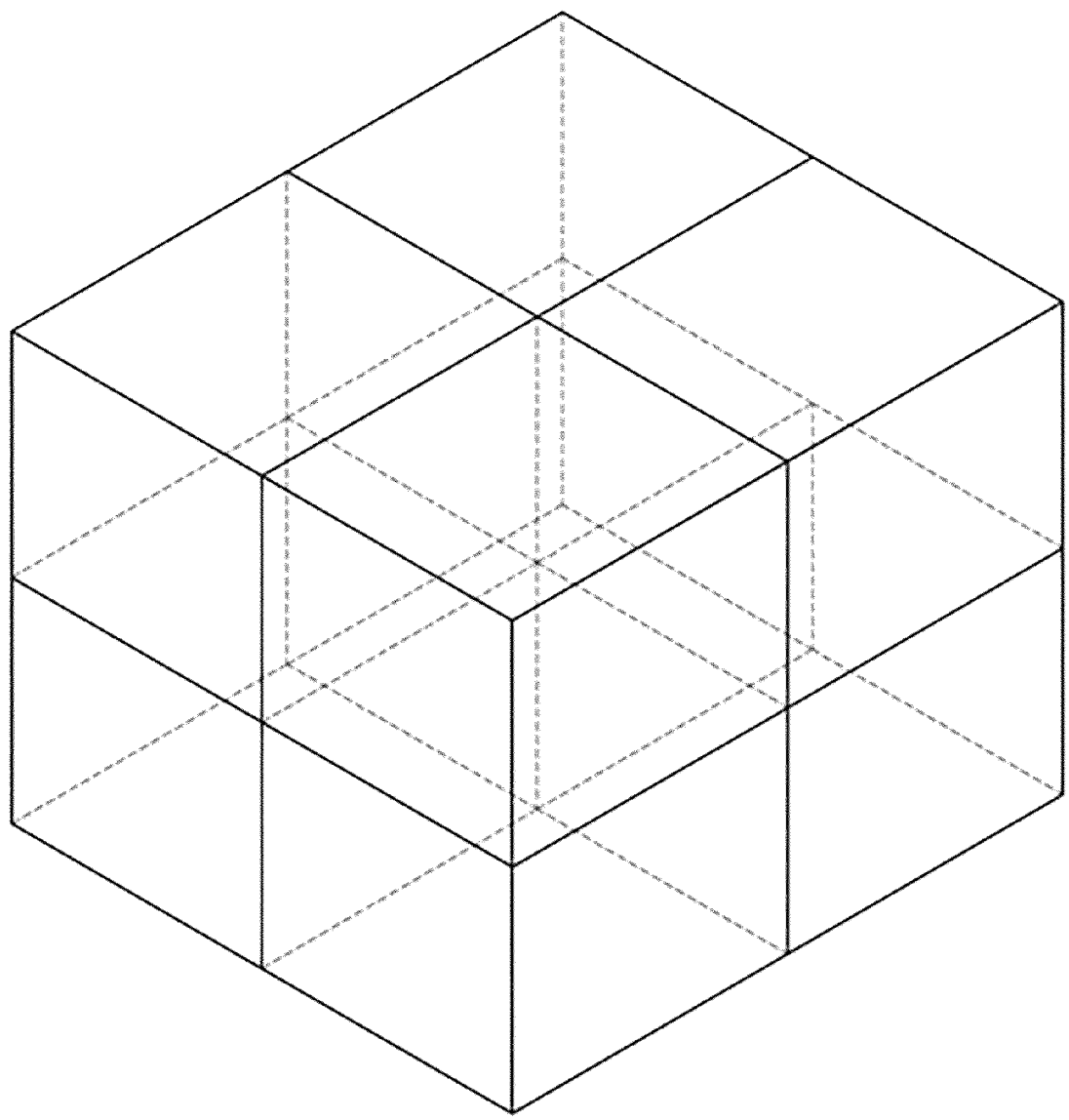
FIGS. 3 to 5 are reference diagrams for illustrating cube partitioning and allocation of spatial values.
Figure 4:
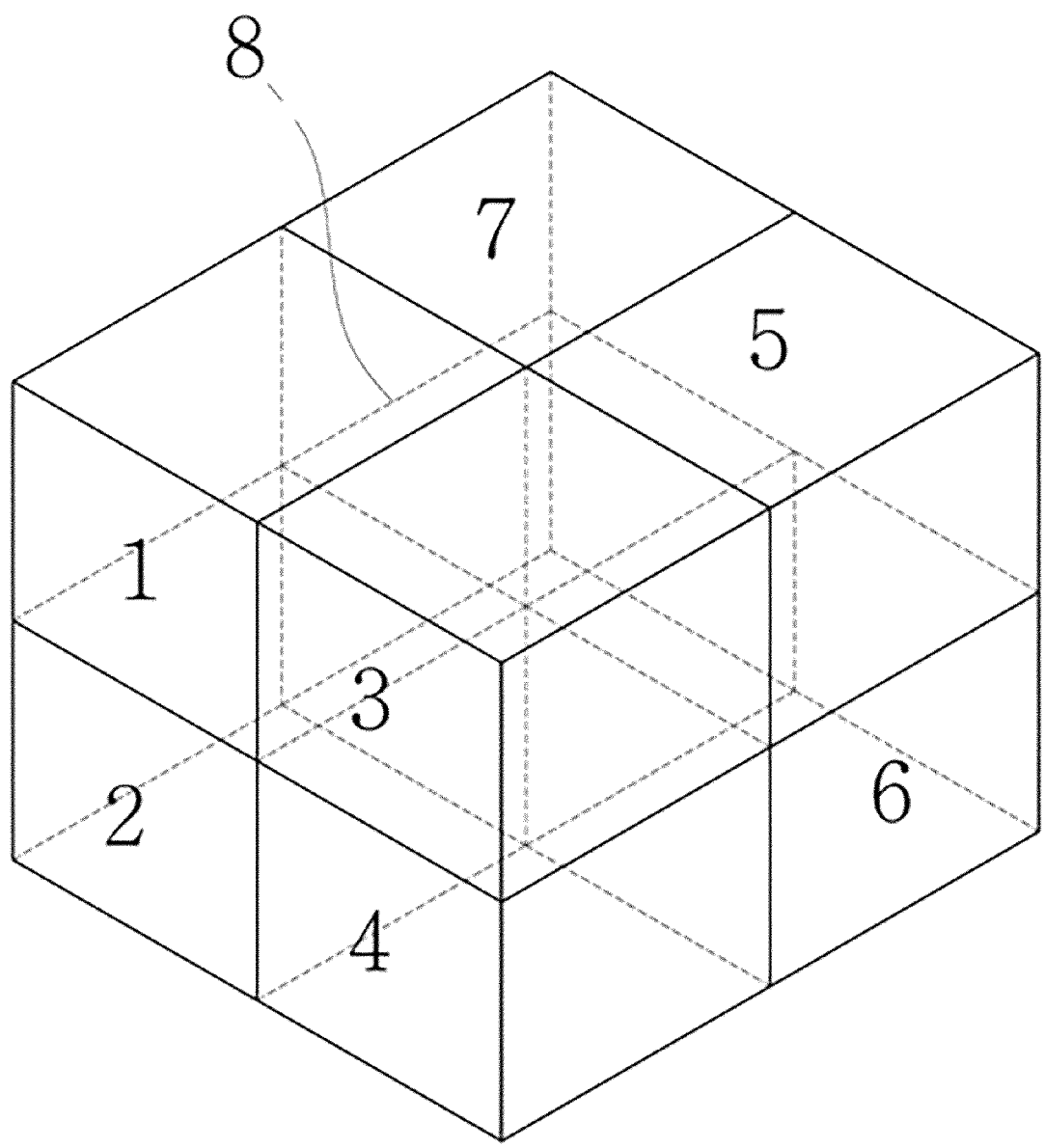

The processor partitions a solid base block indicating a predetermined three-dimensional space into a plurality of blocks in step S100. In an embodiment, the solid base block is a cube corresponding to the predetermined three-dimensional space, as shown in FIG. 2. The solid base block is given a basic block value, and the value may be '1'. In step S100, the processor partitions the cube into a plurality of equal parts, for example, eight equal parts as shown in FIG. 3. Next, the processor allocates a block value to each of the blocks resulting from partitioning in step S110. As shown in FIG. 4, the processor may give different block values from 1 to 8 to the eight blocks obtained by partitioning the solid base block into the eight equal parts. For reference, in the example of FIG. 4, odd numbers, 1, 3, and 7, are given to the upper blocks, and even numbers, 2, 4, 6, and 8, are given to the lower blocks.

Figure 5:
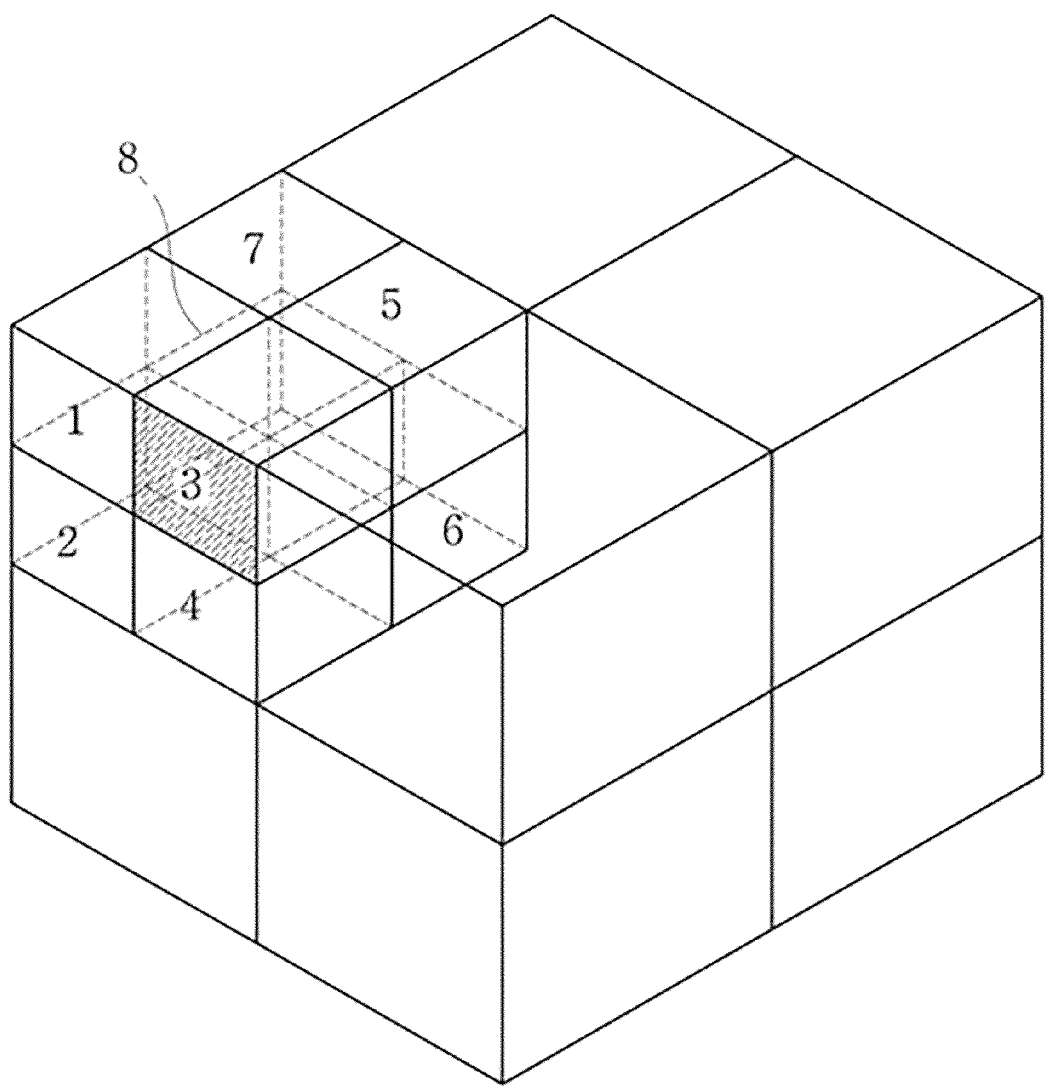

Next, the processor repeats a block partitioning process and a block value allocation process for each of the blocks resulting from partitioning, in step S120. FIG. 5 shows that among blocks 1 to 8 resulting from partitioning block 1 that is a base block, block 1 is partitioned into eight equal parts and block values of 1 to 8 are allocated. In addition, step S120 is repeatedly performed until the size of blocks resulting from partitioning reaches a preset minimum block size. The minimum block size may be 1 cm2, 1 mm2, 1 µm2, or the like, and a setting value may be changed by the user.

Lastly, the processor represents, on the basis of the block values given to the blocks as described above, a location within the three-dimensional space as a coordinate and provides information in step S130. For example, in FIG. 5, the hatched block is given a coordinate value of '113', following the path of base block 1→sub block 1→sub block 3. Accordingly, by using a solid base block indicating a predetermined three-dimensional space, a location within the three-dimensional space is represented as a coordinate and location identification is achieved.

Figure 6:
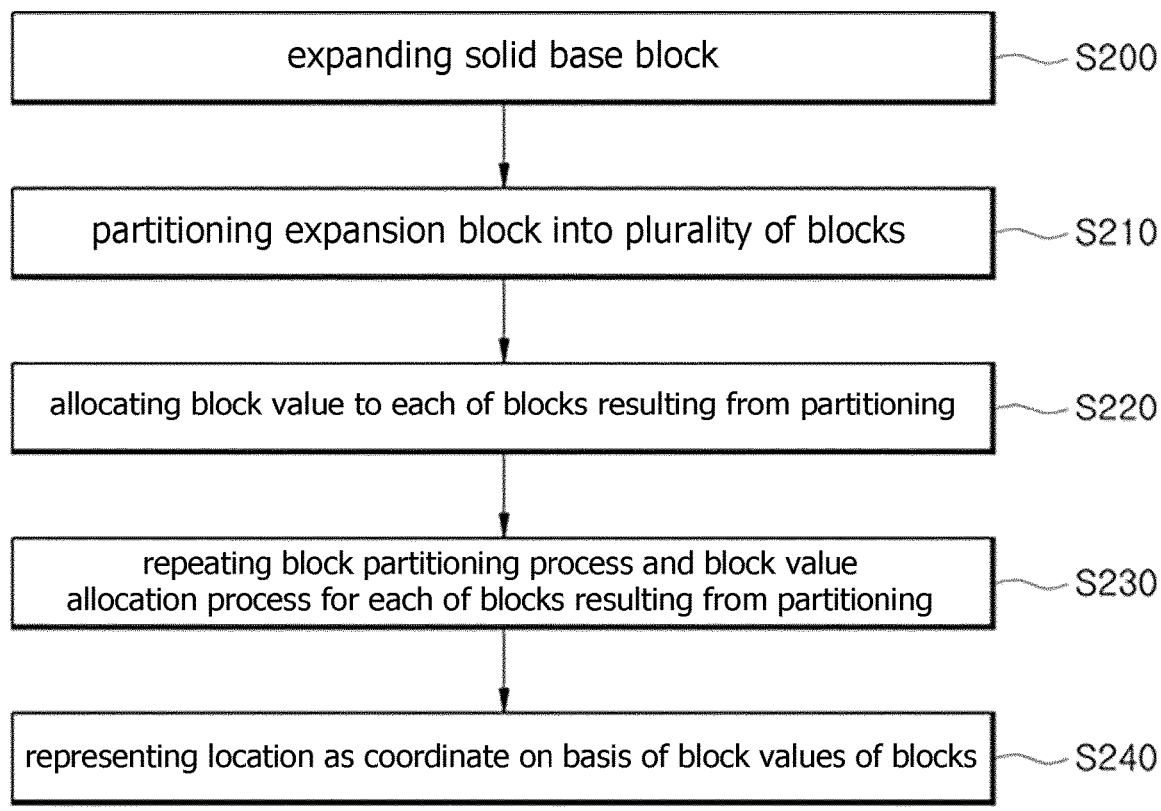
FIG. 6 is a flowchart illustrating a method for representing a location in a three-dimensional space as a coordinate by using a solid figure according to another embodiment.

In the meantime, it is possible to represent a particular location as a coordinate and identify the particular location even in an external space outside a predetermined three-dimensional space. First, as shown in FIG. 6, the processor expands a base block by a predetermined multiplier (for example, eight) and partitions the expanded block into a plurality of blocks in steps S200 and S210. In step S210, the processor may perform partitioning into eight equal parts, which is equal to the multiplier for expansion. Next, the processor allocates a block value to each of the blocks resulting from partitioning in step S220. This is conceptually virtually the same as FIG. 4. Furthermore, FIG. 4 shows that the base block is expanded eight times and a block value is allocated to each of the blocks resulting from partitioning in step S210. Afterward, the processor repeats a block partitioning process and a block value allocation process for each block newly obtained through expansion and partitioning in step S230. Step S230 is also repeated until the size of a block reaches a preset minimum block size.

Lastly, the processor represents, on the basis of the block values given to the blocks obtained through expansion and partitioning, a three-dimensional location as a coordinate and provides information in step S240. For example, in FIG. 5, when the base block is an expansion block resulting from expansion, the hatched block is given a coordinate value of '1.13', following the path of base block 1→expansion block 1→sub block 3. Herein, the dot symbol represents expansion and may be replaced with another particular symbol. Accordingly, by using a solid base block indicating a predetermined three-dimensional space, a location in the three-dimensional space as well as the external space is represented as a coordinate and location identification is achieved.

In the meantime, the above description with reference to FIGS. 2 and 6 may be performed together. That is, when a solid base block indicating a predetermined three-dimensional space is input, the processor may perform the processing according to FIG. 2 on the solid base block as well as the processing according to FIG. 6. Alternatively, the processor may perform the processing shown in FIG. 2 by default, while may perform the processing shown in FIG. 6 only when there is a user command. In addition, the multiplier for expansion may be set and changed by a user.

Figure 7:
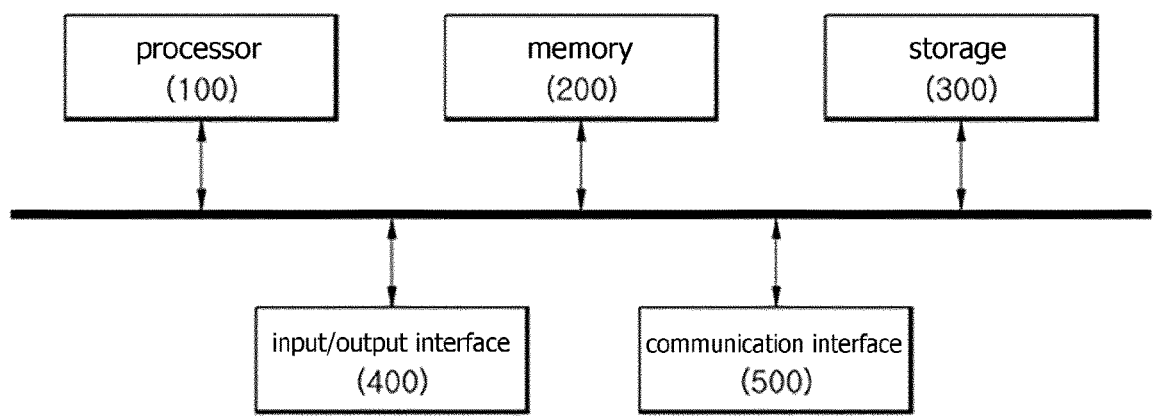
FIG. 7 is a block diagram illustrating a computing device according to an embodiment.

FIG. 7 is a block diagram illustrating a computing device according to an embodiment. The above-described methods may be performed by at least one computing device constituting an embodied learning assistance system, specifically, by at least one processor belonging to the at least one computing device. As shown in FIG. 7, the computing device may include a processor 100, a memory 200, a storage 300, an input/output interface 400, and a communication interface 500. The processor 100 may include a central processing unit (CPU), a graphics processing unit (GPU), or a micro processor equipped with at least one processing core similar thereto. In the memory 200, data, meta data, and a program for execution by the processor 100 may be stored. The memory 200 may include at least one volatile memory and at least one non-volatile memory, and may be internal or distributed memory. The storage 300 is a storage medium for storing data and instructions, and may include a non-transitory storage. The storage 300 may include at least some of a hard disk drive, flash memory, an optical disk, a magneto-optical disk, and a universal serial bus (USB) drive.

The input/output interface 400 may include at least one input and/or output device that enables a user to provide input, receive output, and exchange data with other computing devices. The input/output interface 400 may be a mouse, a keypad or keyboard, a camera, an optical scanner, a network interface, a modem, or other known I/O devices, or may include a combination thereof. The input/output interface 400 may include at least some of a graphics engine, a display, at least one output driver (for example, a display driver), at least one audio speaker, and at least one audio driver. The communication interface 500 may provide at least one interface for network communication (for example, packet-based communication) between the computing device and at least one another computing device. For example, the communication interface 500 may include a network interface controller (NIC) or a network adaptor for communication over Ethernet or other wired networks, or may include a wireless NIC or a wireless adaptor for communication over a wireless network, such as Wi-Fi.

In the meantime, a bus may include hardware, software, or both for connecting the components of the computing device to each other. For example, the bus may include Accelerated Graphics Port (AGP) or other graphics buses, an Enhanced Industry Standard Architecture (EISA) bus, a front-side bus (FSB), a hypertransport (HT) interconnect, an Industry Standard Architecture (ISA) bus, an INFINIBAND interconnect, a low-pin-count (LPC) bus, a memory bus, an Micro Channel Architecture (MAC) bus, a Peripheral Component Interconnect (PCI) bus, a PCI-Express (PCIe) bus, a serial technology attachment (SATA) bus, a Video Electronics Standards Association Local (VESA Local, VL) bus, other suitable buses, or a combination thereto. The above components of FIG. 7 are exemplary, so the computing device may include only some of the components shown in FIG. 7, and may also include other components not shown.

In the meantime, the above-described method for representing a location in a three-dimensional space as a coordinate by using a solid figure may be written as a computer program. The codes and/or code segments that make up such a program can be easily inferred by a computer programmer in the art. In addition, such a program may be stored in a computer-readable recording medium and read and executed by a PC, thereby realizing the method for representing a location in a three-dimensional space as a coordinate. Such a recording medium may be a magnetic recording medium, an optical recording medium, or the like.

The exemplary embodiments of the present disclosure have been particularly described. It will be understood by those skilled in the art that various changes in form are possible without departing from the essential features of the disclosure. Thus, the exemplary embodiments should be considered in a descriptive sense only and not for purposes of limitation. Therefore, the scope of the disclosure is defined not by the detailed description of the disclosure but by the following claims, and all differences within the scope will be construed as being included in the exemplary embodiments.

The invention claimed is:

1. A method for representing a location in a three-dimensional space as a coordinate by using a solid figure, the method being executed by a specialized computing system comprising a processor, a memory, a storage, an input/output interface, and a communication interface and the method comprising:
   partitioning, by the processor, a solid base block into a plurality of blocks, the solid base block indicating the three-dimensional space predetermined;
   allocating, by the processor, a block value to each of the blocks resulting from partitioning; and
   repeating, by the processor, a block partitioning process and a block value allocation process for each of the blocks resulting from partitioning,
   generating, by the processor, an expansion block by expanding the base block in an expansion block generation step;
   partitioning, by the processor, the expansion block into a plurality of blocks in an expansion block partitioning step;
   allocating, by the processor, a block value to each of the blocks resulting from partitioning in the expansion block partitioning step;
   repeating, by the processor, the block partitioning process and the block value allocation process for each of the blocks resulting from partitioning in the expansion block partitioning step; and
   representing, by the processor, on the basis of the block values of the blocks that have been obtained, a particular location in or outside the three-dimensional space as a coordinate and identifying the location,
   wherein the computing system is specifically configured to perform real-time spatial coordinate mapping for autonomous navigation, 3D printing, or smart city infrastructure management, and wherein the method provides an improvement over conventional spatial mapping techniques by dynamically adjusting block partitioning based on real-time input data from spatial sensors, and generating location coordinates in real-time, thereby enabling enhanced precision and efficiency in three-dimensional spatial representation and control.

2. The method of claim 1, wherein the solid base block is a cube.

3. The method of claim 1, wherein the block partitioning process is repeated until a size of the blocks resulting from partitioning reaches a predetermined minimum block size.

4. A non-transitory computer-readable recording medium having a program recorded thereon, the program enabling a method of claim 1 to be executed by a computer.

5. A non-transitory computer-readable recording medium having a program recorded thereon, the program enabling a method of claim 2 to be executed by a computer.

6. A non-transitory computer-readable recording medium having a program recorded thereon, the program enabling a method of claim 3 to be executed by a computer.

* * * * *